June 29, 1943.        J. VAN VULPEN         2,323,259
VENTILATED VAPOR REGULATOR
Filed April 11, 1942        2 Sheets-Sheet 1
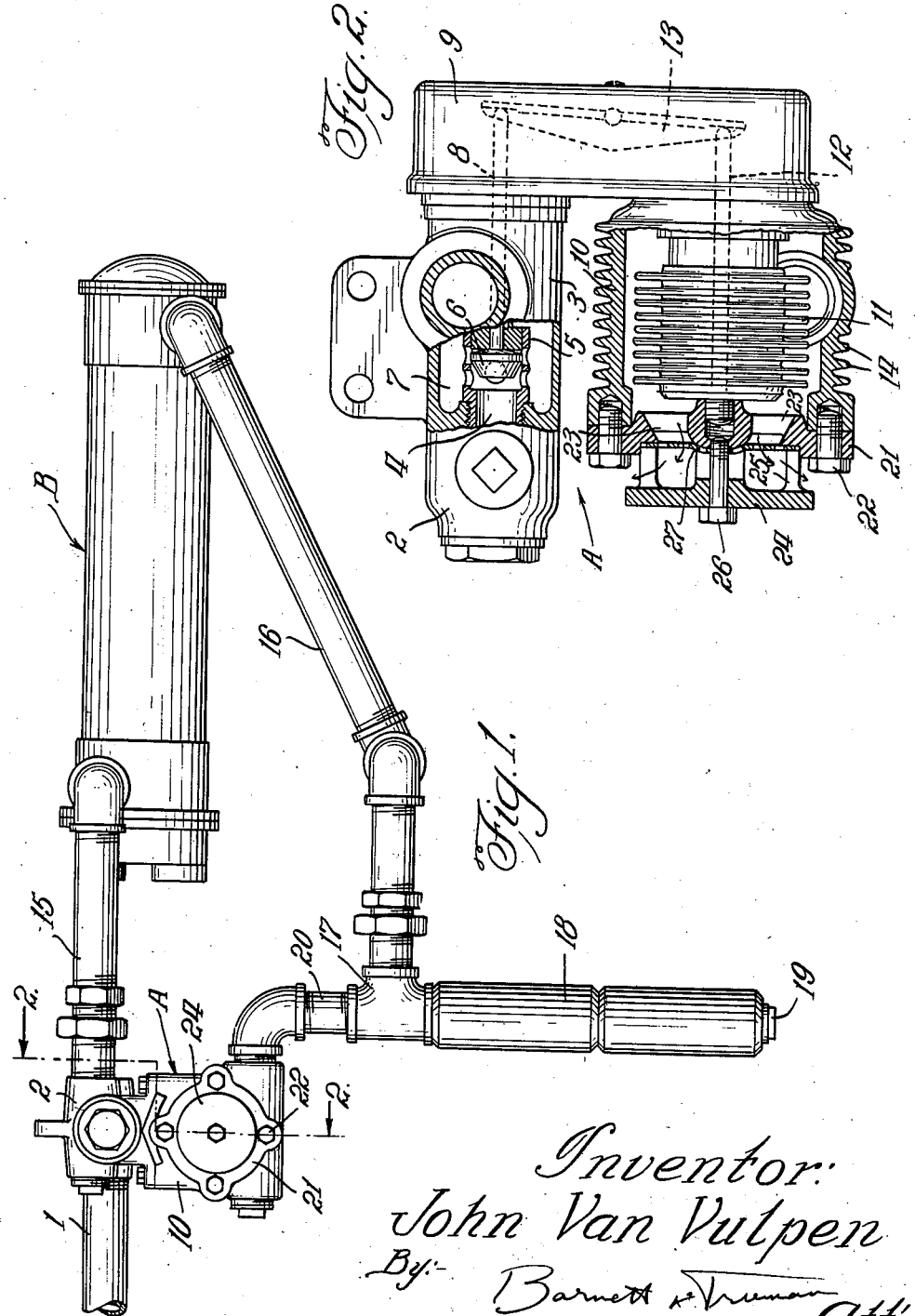
Inventor:
John Van Vulpen
By:- Barnett & Truman
Attys.

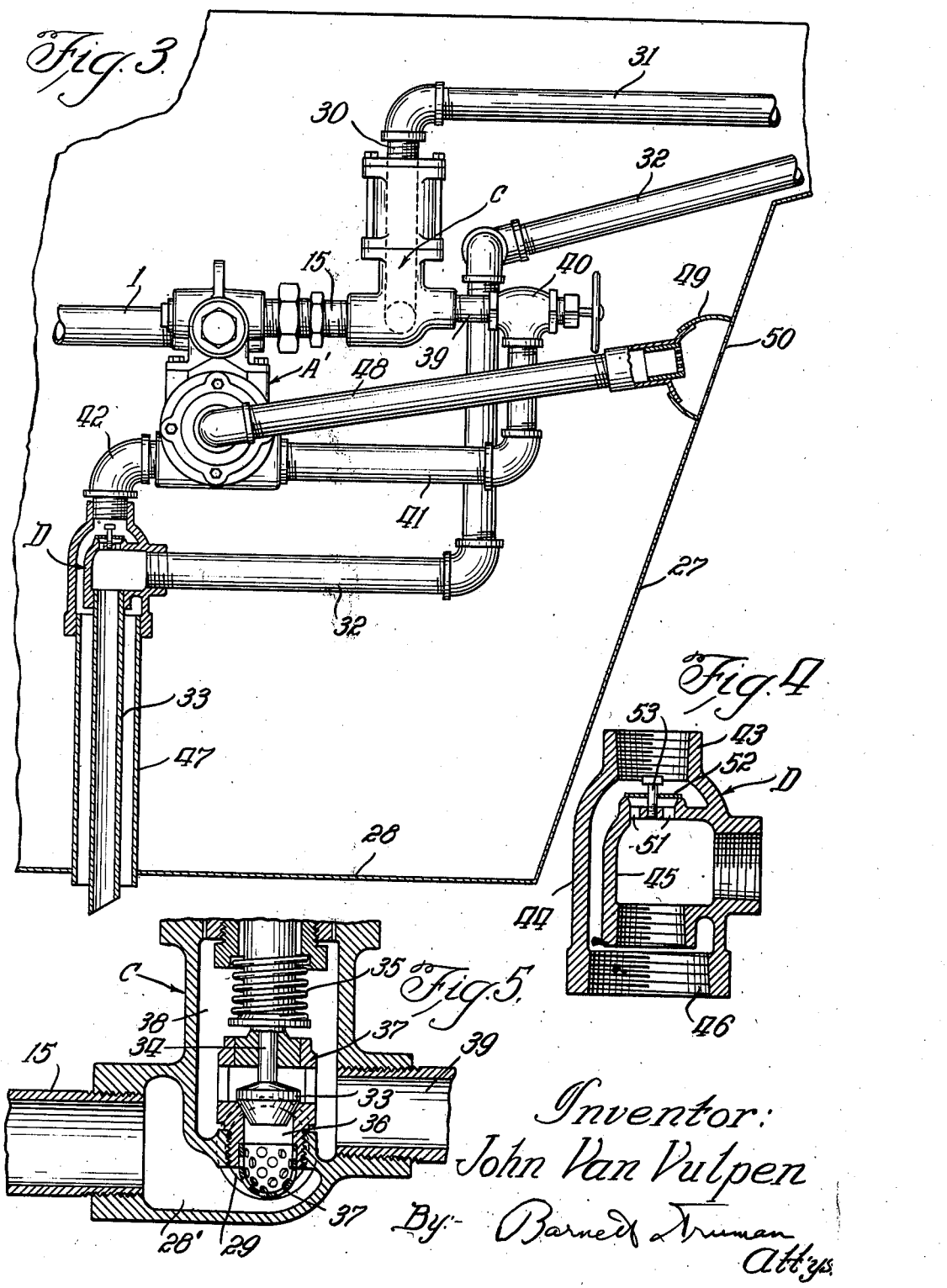

Patented June 29, 1943

2,323,259

UNITED STATES PATENT OFFICE 2,323,259

VENTILATED VAPOR REGULATOR

John Van Vulpen, Chicago, Ill., assignor to Vapor Car Heating Company, Inc., Chicago, Ill., a corporation of New York Application April 11, 1942, Serial No. 438,615

2 Claims. (Cl. 236—40)

This invention relates to new and useful improvements in a ventilated vapor regulator, and more particularly to a steam flow-valve controlled by a thermostat in combination with means for ventilating the housing in which the thermostat is positioned thereby making the vapor-regulator more quickly responsive to temperature changes in the steam circulation system.

The usual vapor regulator comprises a valve which controls the flow of steam from the source to a heating device, and a thermostat which acts to open and close the valve. This thermostat is confined in a housing into which flow returned fluids from the heating system so that excess steam will expand the thermostat and cause the valve to close. It is essential that the thermostat shall contract quickly to re-open the valve as soon as the thermostat is no longer subject to steam temperature, and for this reason the thermostat housing is usually formed to dissipate heat as quickly as possible, but sometimes the vapor-regulator is so located that the problem of dissipating heat from the vicinity of the thermostat becomes more troublesome and it is desirable to thoroughly ventilate the housing so as to quickly remove heat therefrom and cool the thermostat whenever steam is no longer being admitted to the housing.

The principal object of this invention is to provide a continuous stream of cooling air through the thermostat housing.

Another object is to provide means for continuously ventilating the vapor-regulator.

Another object is to provide safety means, in combination with the ventilating system, for directing hot gases from the heater into contact with the thermostat so as to cut off the steam supply to the heater under emergency conditions.

Other objects and advantages of the invention will be more apparent from the following detailed description of certain approved forms of apparatus for carrying out this invention.

In the accompanying drawings:

Fig. 1 is a side elevation of one approved form of the heating system embodying an example of the vapor regulator.

Fig. 2 is a side elevation of the regulator taken partially in central longitudinal section substantially on the line 2—2 of Fig. 1.

Fig. 3 is a side elevation, partially broken away in central vertical section, of another form of heating system embodying the vapor regulator with a slightly different form of ventilating means in combination with a cooperating emergency means for operating the regulator to cut off the steam supply.

Fig. 4 is an enlarged central section through the emergency blow-off valve also shown in Fig. 3.

Fig. 5 is a central vertical section of the maximum-pressure valve shown in elevation in Fig. 3, Fig. 5 being taken in the same plane as Fig. 3.

Referring first to Figs. 1 and 2, steam under relatively high pressure flows from a suitable source of supply through pipe 1 into the vapor-regulator, shown generally at A. This vapor-regulator may be any one of a variety of well known forms, but in the present instance is shown as of the approved form disclosed and claimed in the patent to Parks et al. 2,238,369, April 15, 1941. Steam from the supply pipe 1 flows into an inlet chamber within the end portion 2 of a valve casing 3, steam from this chamber flowing through passage 4 and ports or openings in a cage 5 which houses the movable valve member 6 into an outlet chamber 7. The steam flow through passage 4 is cut off by closing the valve 6 against the seat at the outlet end of the passage, this movement of valve 6 being accomplished by the operating stem 8 which extends through suitable sealing means into the casing 9 which connects the valve casing 3 with the thermostat housing 10. A thermostatic member 11, usually in the form of an expansible bellows diaphragm containing a quantity of heat responsive fluid is mounted within the housing 10 so that when heated by the admission of steam into the housing, the bellows will expand and by means of a stem 12 extending through suitable sealing means will tilt the intermediately pivoted lever 13 in casing 9 and thus push in the stem 8 and close the valve 6. When the steam is condensed or withdrawn from housing 10 the bellows 11 will contract and permit the valve 6 to be opened by means of a suitable spring (not here shown). Preferably the housing 10 is made separate from the valve housing 3 and is spaced therefrom and provided with a plurality of radiating ribs 14 on its outer surface so as to facilitate the dissipation of heat from the housing to permit the thermostat to cool off and contract.

In the example shown in Fig. 1, steam from the vapor regulator A flows from chamber 7 through pipe 15 into one set of passages in a water-heater B, the excess steam and condensate flowing out through pipe 16 into a vertically disposed T-fitting 17, the lower outlet of which connects with a drain pipe 18 having a lower outlet 19 through which the condensate is discharged.

Excess steam discharged from the heater B will flow up from the fitting 17 through pipe 20 into the housing 10 so as to cause the thermostat 11 to expand and close valve 6. When this steam in housing 10 condenses, the water will drain out through the drainage connections 18 and 19.

The water heater B is provided with another set of inlet and discharge pipes through which water flows to be heated by the steam, these other pipes not being shown in Fig. 1. Obviously any other suitable type of heating radiator, or other apparatus for using steam, could be substituted for the water-heater B here shown by way of example.

While the housing 10 is designed to enclose and protect the thermostatic member 11 and hold steam in contact therewith when the flow-control valve is to be closed, this housing is also designed, as has already been noted, to facilitate and expedite the dissipation of heat therefrom so that the thermostat will contract and the valve will be promptly opened when more steam is required. However, it has been found desirable, particularly where the vapor regulator is positioned in a normally hot or confined location, to additionally ventilate the thermostat housing 10 so as to facilitate and expedite the dissipation of heat therefrom. As shown in Fig. 2, the cover plate 21 at one end of the housing, held in place by bolts 22, is in the form of a spider adapted to support the thermostat 11 and is provided with a plurality of openings 23 over which the cover 24 is supported by the spaced legs 25 so that gases can escape from the housing through the communicating passages, as indicated by the arrows. Cover plate 24 is held in place by bolt 26 and a screen 27 is clamped between the plates 24 and 21. It will thus be seen that while the housing 10 is substantially closed to hold the steam within the housing in contact with thermostat 11, the housing is provided with passages through this end cover to permit the housing to be adequately ventilated. The drainage pipes 18 and 20 not only serve to drain condensate from the vapor regulator and from the heater B, but also serve as a passage through which cold outside air can flow up through the housing 10 and out through the openings in the cover plates so as to efficiently ventilate the housing and permit the thermostat to cool and contract whenever steam ceases to be admitted to the housing.

The somewhat different assembly shown in Fig. 3 comprises a vapor regulator A' which may be of substantially the same form as already described and a group of supply and drainage pipes, all of which are located beneath the floor of a railway car but are not directly open to the outside air. This assembly of parts is enclosed by an outer housing consisting of plates 27 and 28 so as to "stream-line" the car and also protect these parts from flying stones, etc. beneath the car. Consequently the vapor regulator A' will be in an enclosed and heated space which renders the problem of ventilation even more difficult.

In the present instance the vapor regulator A' is adapted to supply steam at a predetermined low but super-atmospheric pressure to a radiator or plurality of radiators, usually positioned within the car body. Steam flows as before from the source of supply through pipe 1 into the inlet chamber of the vapor regulator. Steam from the outlet chamber of the vapor regulator flows through pipe 15 into chamber 28' of a maximum-pressure valve, indicated generally at C. Some of this steam flows through outlet 29 and pipes 30 and 31 to the inlet valve of a radiator usually positioned in the body of the car above the assembly shown in Fig. 3. The condensate and other fluids from the radiator flow back through piping 32, the casing of a blow-off valve D and drainage pipe 33' downwardly through the outer casing 28 and thence to the outer atmosphere. It will be noted that in this form of assembly no return steam from the radiator is directed back to the thermostat housing 10 of the vapor-regulator A', but this thermostat is controlled by a stream diverted back to the vapor regulator from the maximum pressure valve C, as hereinafter described. A valve 33 (Fig. 5) carried by a stem 34 and held down by a spring 35 normally closes the upper end of a passage 36 leading through screen 37 from the lower chamber 28'. When pressure in supply chamber 7 and outlet pipe 15 of the vapor regulator rises above a predetermined maximum (for example five pounds per square inch) this pressure will lift the valve 33 against the pressure of spring 35 so that steam will flow through passage 36 and the outlets in the cage 37 within which the valve moves, into the upper chamber 38 and thence out through pipe 39. Pipe 39 leads through the normally open hand operated valve 40 and piping 41 into the thermostat-housing 10 of the vapor regulator (see Fig. 2). Thus when the steam pressure in the supply line beyond the vapor regulator A' exceeds a predetermined maximum, valve 33 will be opened and steam will be diverted through the pipe-loop just described into the thermostat-housing so as to cause the steam valve 6 to be closed and cut down the supply of steam. Ordinarily steam will be continuously supplied through the piping 31 to the radiator as long as this supply pressure does not exceed the predetermined maximum, but whenever this pressure is exceeded the cut-off valve 6 will be temporarily closed.

An elbow pipe connection 42 leads from the housing 10 to the open upper end 43 of the bell-shaped housing 44 (see Fig. 4) which encloses the inner elbow 45 connecting the drainage pipes 32 and 33, already described. Into the lower end 46 of the bell-shaped housing 44 is connected an outer drainage and ventilating pipe 47 which extends down around the pipe 33 into the open air beneath the casing 28. The outer piping 42 and 47 serves as a means for draining condensate from the thermostat housing 10. However, the main object of this outer piping is to permit cool outer air to flow upwardly into and through the housing 10 for ventilating purposes, as indicated by the arrows.

Instead of being vented directly from openings in the cover of housing 10, as in the first described form of the invention, the cover plate of the housing is connected through a pipe 48 extending to the outer air through a closure member 49 and a screen 50 positioned in the wall 27 of the outer enclosure. Consequently a continuous flow of cooling air can pass up through the drainage piping 47 and 42 into and through the thermostat housing 10 and thence out through pipe 48.

Passages 51 in the upper end of housing 45 (Fig. 4) are normally closed by a valve plate 52 loosely mounted on guide pin 53. In case steam or other gases under pressure accumulate in the drainage pipe 32 the valve plate 52 will be blown open and the steam will flow through pipe 42 into the thermostat housing 10 and cause the thermostat to expand, thus cutting off the further flow of steam to the radiator. Thus the lower ventilating pipes not only serve to admit cooling air to the thermostat housing but also admit excess steam to the housing (under emergency conditions) so as to cause the vapor-regulator to function and cut off the steam supply.

I claim:

1. The combination with a vapor-regulator comprising a steam flow-control valve, a thermostatic member, operating connections between the member and valve, a housing enclosing said thermostatic member, and means for conducting heating fluids into the housing, of a heat transmitting member, a supply pipe leading from the valve to the heat transmitting member, a discharge pipe leading from the heat-transmitting member to the outer air, means for ventilating the housing comprising inlet and outlet pipes connecting the housing with the outer air, a blow-off valve in the discharge-pipe, said blow-off valve communicating with the inlet pipe so as to conduct steam from the discharge pipe to the thermostat housing when the blow-off valve opens.

2. The combination with a vapor-regulator comprising a steam flow-control valve, a thermostatic member, operating connections between the member and valve, a housing enclosing said thermostatic member, and means for conducting heating fluids into the housing, of a heat transmitting member, a supply pipe leading from the valve to the heat transmitting member, a discharge pipe leading from the heat-transmitting member to the outer air, of an enclosure within which said vapor regulator is positioned, and means for ventilating the housing comprising inlet and outlet pipes connecting the housing with the air outside the enclosure, a blow-off valve in the discharge pipe, said blow-off valve opening into the inlet pipe whereby steam from the discharge pipe will be conducted into the housing when the blow-off valve is open.

JOHN VAN VULPEN.